United States Patent
Yan et al.

(10) Patent No.: US 8,630,250 B2
(45) Date of Patent: Jan. 14, 2014

(54) METHOD, SYSTEM AND APPARATUS FOR MINIMIZATION OF DRIVE TESTS

(75) Inventors: Nan Yan, Beijing (CN); Haitao Li, Beijing (CN); Xiaodong Yang, Beijing (CN); Jing Fu, Beijing (CN); Jinbo Zhao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/701,477

(22) PCT Filed: Aug. 12, 2011

(86) PCT No.: PCT/CN2011/078373
§ 371 (c)(1),
(2), (4) Date: Feb. 19, 2013

(87) PCT Pub. No.: WO2012/019562
PCT Pub. Date: Feb. 16, 2012

(65) Prior Publication Data
US 2013/0142143 A1 Jun. 6, 2013

(30) Foreign Application Priority Data
Aug. 13, 2010 (CN) .......................... 2010 1 0254002

(51) Int. Cl.
*H04W 4/00* (2009.01)
(52) U.S. Cl.
USPC ........................................................ 370/329
(58) Field of Classification Search
None
See application file for complete search history.

(56) References Cited

U.S. PATENT DOCUMENTS

2011/0306345 A1* 12/2011 Wu .............................. 455/436
2012/0040621 A1* 2/2012 Jung et al. ................. 455/67.11

FOREIGN PATENT DOCUMENTS

| CN | 1901392 A | 1/2007 |
| CN | 101179818 A | 5/2008 |

(Continued)

OTHER PUBLICATIONS

International Search Report for PCT/CN2011/078373—mailed Nov. 3, 2012.

(Continued)

*Primary Examiner* — Chirag Shah
*Assistant Examiner* — Srinivasa Reddivalam
(74) *Attorney, Agent, or Firm* — Gilberto M. Villacorta; Foley & Lardner LLP

(57) ABSTRACT

Disclosed are a minimization of drive test (MDT) method, system, and device, relating to the technical field of radio communications for solving the problem that the MDT measurement data fails to be reported because the data volume of MDT measurement data reported by a user equipment (UE) exceeds the volume of data capable of being stored by a PDCP module. In the present invention, a UE receives a notification, sent from a base station, of reporting an MDT measurement result; and when a total data volume of the stored MDT measurement result data to be reported is greater than the volume of data capable of being stored by a PDCP module, the UE reports the MDT measurement result data to the base station in one or more times, the total data volume of MDT measurement result data reported each time being not greater than the volume of data capable of being stored by the PDCP module. With the present invention, the problem that the MDT measurement data fails to be reported because the data volume of MDT measurement data reported by the UE exceeds the volume of data capable of being stored by the PDCP module can be solved.

5 Claims, 7 Drawing Sheets

(56) References Cited

FOREIGN PATENT DOCUMENTS

| | | |
|---|---|---|
| CN | 101222729 A | 7/2008 |
| CN | 101291508 A | 10/2008 |

OTHER PUBLICATIONS

Written Opinion of the International Searching Authority for PCT/CN2011/078373—mailed Nov. 3, 2012.

* cited by examiner

METHOD, SYSTEM AND APPARATUS FOR MINIMIZATION OF DRIVE TESTS

This application is a US National Stage of International Application No. PCT/CN2011/078373, filed 12 Aug. 2011, designating the United States, and claiming the benefit of Chinese Patent Application No. 201010254002.5, filed with the Chinese Patent Office on Aug. 13, 2010 and entitled "Method, system and apparatus for Minimization of Drive Tests", which is hereby incorporated by reference in its entirety.

FIELD OF THE INVENTION

The present invention relates to the field of wireless communication and particularly to a method, system and apparatus for minimization of drive tests.

BACKGROUND OF THE INVENTION

It is desirable in a future mobile communication system to alleviate human participation in planning, operating and maintaining a network by introducing a network self-optimization mechanism in which the network optimizes a parameter automatically according to a statistic to reduce the cost of building and operating the network. At present it is desirable to adopt an approach in which UEs could be configured by the network to report something for the purpose of alleviating the workload of a manual drive test. On the other hand, it is also desirable to obtain radio measurement information of an area inaccessible to a normal manual drive test.

As ascertained in the R10 protocol of the Long Term Evolution (LTE) system, the architecture of applying the control plane is adopted for a Minimization Drive Test (MDT), and this architecture is advantageous in that an evolved base station (base station) can control a UE accurately. The architecture of applying the control plane has to adopt Radio Resource Control (RRC) signaling to bear parameters with which the UE is configured by the network and information reported from the UE to the network. The RRC signaling has to be encrypted and integrity-protected by a Packet Data Convergence Protocol (PDCP) layer.

MDT measurement is divided into Immediate MDT measurement and Logged MDT measurement particularly as follows:

In Immediate MDT measurement, a UE measures and reports an MDT in a connected mode. Reuse the form of Radio Resource Management (RRM) measurement, a report is sent to the base station/RNC once a report condition is satisfied.

In Logged MDT measurement, a UE measures an MDT in an idle mode and reports the MDT in a subsequent connected mode. The measurement result will be obtained and stored in the UE once a configured trigger condition is satisfied and will be reported to the base station/RNC in a subsequent appropriate occasion.

A log configuration of an MDT is transmitted from the network to a UE in a connected mode, using a new configuration method instead of extending the existing RRM measurement. Specifically:

At the UE side, when the RRC connection is released, the UE will not release the received MDT log configuration but still store it, start MDT measurement and collect a measurement result in an idle mode.

At the network side, when the RRC connection is released, the network will neither store the information on an MDT context for a logged MDT nor transport the MDT context between the network nodes. The MDT context stored at the network side will be released together with the RRC connection.

In the case of a logged MDT, a UE will report a log available indicator to the network side in RRC signaling if the UE enters a connected mode or moves to a new cell when the UE has an available log. Taking an LTE system as an example, FIG. 1 illustrates an RRC connection setup procedure.

Upon successful setup of an RRC connection, a UE will transmit an RRC Connection Setup Complete message to the network side, where the message carries an indicator of whether the UE stores an available log. Subsequently upon reception of the indicator the network side can request the UE to report a stored log result of an MDT measurement.

Alike in LTE handover and reestablishment procedures, a UE will transmit a log available indicator to a handover target cell/a reestablished cell to indicate the presence of a log result available to the new cell if the UE stores the log result.

In a Universal Mobile Communication System (UMTS), a UE will also transmit a log available indicator to an updated target cell if a relocation procedure of a Serving Radio Network Subsystem (SRNS) takes place.

The following seven measurement items to be measured by a UE are defined for existing MDT measurement:

A Periodical downlink pilot measurement, a Serving Cell becoming worse than a threshold, a transmit power headroom becoming less than a threshold, a Random access failure, a Paging Channel Failure, a Broadcast Channel failure and a Radio link failure report.

Besides the foregoing seven measurement items, addition of other measurement items, e.g., a measurement item related to a Quality of Service (QOS) of a UE, will not be precluded in a subsequent standardization process. If several of these measurement items are used for an immediate MDT in a connected mode, then a configuration of these measurements is transmitted at the network side, and thus the UE will monitor them in a connected mode and still reuse a report message, used for an RRM measurement, for a report to the network side when an event is triggered.

The inventors have identified the following technical problems in the prior art during making of the invention:

A report of MDT measurement result data of a UE is borne over a Signal Radio Bearer 2 (SRB2), and a problem will occur with the report if the size thereof exceeds a range that can be accommodated by a PDCP module: the PDCP module can not support RRC signaling with a large amount of data and thus can not apply subsequent security protection and transmit the signaling to an underlying layer for reporting, thus resulting in a failure of reporting the MDT measurement result data.

SUMMARY OF THE INVENTION

Embodiments of the invention provide a method, system and apparatus for a minimization of drive tests to address the problem of failing to report MDT measurement result data due to the data amount of MDT measurement result data reported by a UE exceeding the data amount that can be accommodated by a PDCP module.

A method for reporting an MDT measurement result includes:

receiving, by a user equipment, an instruction to report an MDT measurement result transmitted from a base station; and when the total data amount of stored MDT measurement result data, to be reported, is more than the data amount that can be accommodated by a PDCP module, reporting, by the user equipment, the MDT measurement result data to the base station one or more times, wherein the total data amount of MDT measurement result data reported each time is not more than the data amount that can be accommodated by the PDCP module.

A method for instructing to report an MDT measurement result includes:

receiving, by a base station, MDT measurement result data reported from a user equipment after transmitting an instruction to report an MDT measurement result to the user equipment;

determining, by the base station, whether the user equipment has further unreported MDT measurement result data; and determining, by the base station, from a determination result whether to transmit an instruction to report an MDT measurement result to the user equipment again and if so, transmitting an instruction to report an MDT measurement result to the user equipment again.

A user equipment includes:

a report instruction reception unit configured to receive an instruction to report an MDT measurement result transmitted from a base station; and an MDT result report unit configured, when the total data amount of MDT measurement result data, to be reported, stored at the present user equipment is more than the data amount that can be accommodated by a PDCP module, to report the MDT measurement result data to the base station one or more times, wherein the total data amount of MDT measurement result data reported each time is not more than the data amount that can be accommodated by the PDCP module.

A base station includes:

an MDT result reception unit configured to receive MDT measurement result data reported from a user equipment after transmitting an instruction to report an MDT measurement result to the user equipment;

a determination unit configured to determine whether the user equipment has further unreported MDT measurement result data; and a processing unit configured to determine from a determination result of the determination unit whether to transmit an instruction to report an MDT measurement result again to the user equipment and if so, to transmit an instruction to report an MDT measurement result again to the user equipment.

A wireless communication system includes:

a user equipment configured to receive an instruction to report an MDT measurement result transmitted from a base station; and when the total data amount of stored MDT measurement result data to be reported is more than the data amount that can be accommodated by a PDCP module, to report the MDT measurement result data to the base station one or more times, wherein the total data amount of MDT measurement result data reported each time is not more than the data amount that can be accommodated by the PDCP module; and the base station configured to receive the MDT measurement result data reported from the user equipment, to determine whether the user equipment has further unreported MDT measurement result data, to determine from a determination result whether to transmit an instruction to report an MDT measurement result to the user equipment again and if so, to transmit an instruction to report an MDT measurement result to the user equipment again.

In the inventive solutions, a user equipment receives an instruction to report an MDT measurement result transmitted from a base station, and if the total data amount of stored MDT measurement result data to be reported is more than the data amount that can be accommodated by a PDCP module, then the user equipment reports the MDT measurement result data to the base station one or more times, and the total data amount of MDT measurement result data reported each time is not more than the data amount that can be accommodated by the PDCP module. As can be apparent, with the invention, the data amount of MDT measurement data reported by the UE will not exceed the data amount that can be accommodated by the PDCP to thereby address the problem of failing to report the MDT measurement result data due to the data amount of MDT measurement result data reported by the UE exceeding the data amount that can be accommodated by the PDCP module.

A method of a periodical MDT measurement includes:

a user equipment receiving information on an MDT measurement period timer configured by a base station, wherein a timing length of the MDT measurement period timer is not more than a preset time length which is a time length required for the data amount of MDT measurement result data, obtained by the user equipment when performing a periodical MDT measurement according to configured MDT measurement contents at a configured MDT measurement period, to reach the data amount that can be accommodated by a PDCP module; and the user equipment performing a periodical MDT measurement within the timing length of the MDT measurement period timer.

A method for configuring an MDT measurement period timer determining, by a base station, a time length required for the data amount of MDT measurement result data, obtained by a user equipment when performing a periodical MDT measurement according to configured MDT measurement contents at a configured MDT measurement period, to reach the data amount that can be accommodated by a PDCP module; and configuring, by the base station, the user equipment with information on an MDT measurement period timer with a timing length which is not more than the time length to instruct the user equipment to perform a periodical MDT measurement within the timing length of the MDT measurement period timer.

A user equipment includes:

a measurement information reception unit configured to receive information on an MDT measurement period timer configured at a base station, wherein a timing length of the MDT measurement period timer is not more than a preset time length which is a time length required for the data amount of MDT measurement result data, obtained by the user equipment when performing a periodical MDT measurement according to configured MDT measurement contents at a configured MDT measurement period, to reach the data amount that can be accommodated by a PDCP module; and an MDT measurement unit configured to perform a periodical MDT measurement within the timing length of the MDT measurement period timer.

A base station includes:

a period determination unit configured to determine a time length required for the data amount of MDT measurement result data, obtained by a user equipment when performing a periodical MDT measurement according to configured MDT measurement contents at a configured MDT measurement period, to reach the data amount that can be accommodated by a PDCP module; and a measurement period configuration unit configured to configure the user equipment with information on an MDT measurement period timer with a timing length not more than the time length to instruct the user equipment to perform a periodical MDT measurement within the timing length of time of the MDT measurement period timer.

A wireless communication system includes:

a base station configured to determine a time length required for the data amount of MDT measurement result data, obtained by a user equipment when performing a periodical MDT measurement according to configured MDT measurement contents at a configured MDT measurement period, to reach the data amount that can be accommodated by a PDCP module and to configure the user equipment with information on an MDT measurement period timer with a timing length which is not more than the time length; and the user equipment configured to receive the information on the MDT measurement period timer and to perform a periodical MDT measurement for the timing length of the MDT measurement period timer.

In the inventive solutions, a base station determines a time length required for the data amount of MDT measurement result data, obtained by a user equipment when performing a periodical MDT measurement according to configured MDT measurement contents at a configured MDT measurement period, to reach the data amount that can be accommodated by a PDCP module, and configures the user equipment with information on an MDT measurement period timer with a timing length not more than the time length, and the user equipment performs a periodical MDT measurement within the timing length of the MDT measurement period timer. As can be apparent, the timing length of the MDT measurement period timer is not more than the time length required for the data amount of MDT measurement result data obtained by the user equipment to reach the data amount that can be accommodated by the PDCP module, so the data amount obtained by the user equipment after performing a periodical MDT measurement within the timing length of the MDT measurement period timer will not exceed the data amount that can be accommodated by the PDCP module, and thus occurrence will be avoided of the problem of failing to report the MDT measurement result data due to the data amount of MDT measurement result data reported by the UE exceeding the data amount that can be accommodated by the PDCP module.

DETAILED DESCRIPTION OF THE EMBODIMENTS

In order to address the problem of failing to report MDT measurement result data due to the data amount of MDT measurement result data reported by a UE exceeding the amount of data that can be accommodated by a PDCP module, an embodiment of the invention provides a method of reporting an MDT measurement result, and in this method, a user equipment receives an instruction transmitted from a base station to report an MDT measurement result, and then if the total data amount of stored MDT measurement result data to be reported is more than the data amount that can be accommodated by a PDCP module, then the user equipment reports the MDT measurement result data to the base station one or more times, where the total data amount of MDT measurement result data reported each time is not more than the data amount that can be accommodated by the PDCP module.

Figure 1:
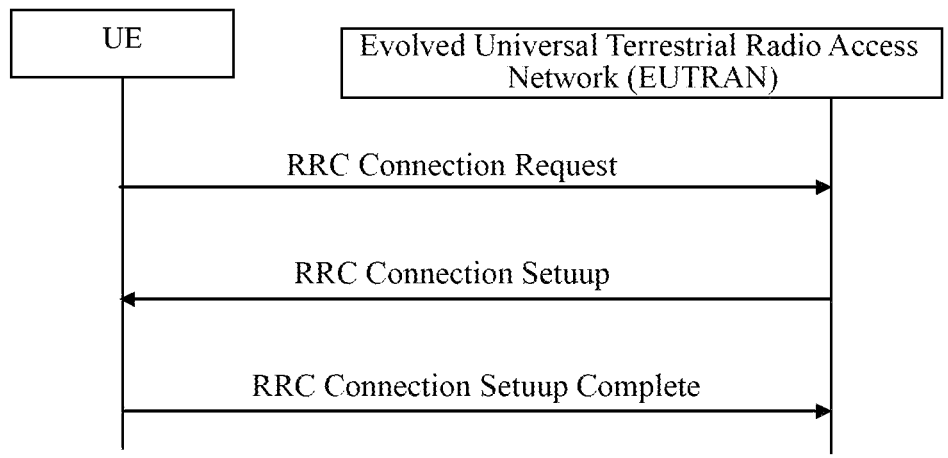
FIG. 1 is a schematic diagram of setting up an RRC connection in the prior art.
Figure 2:
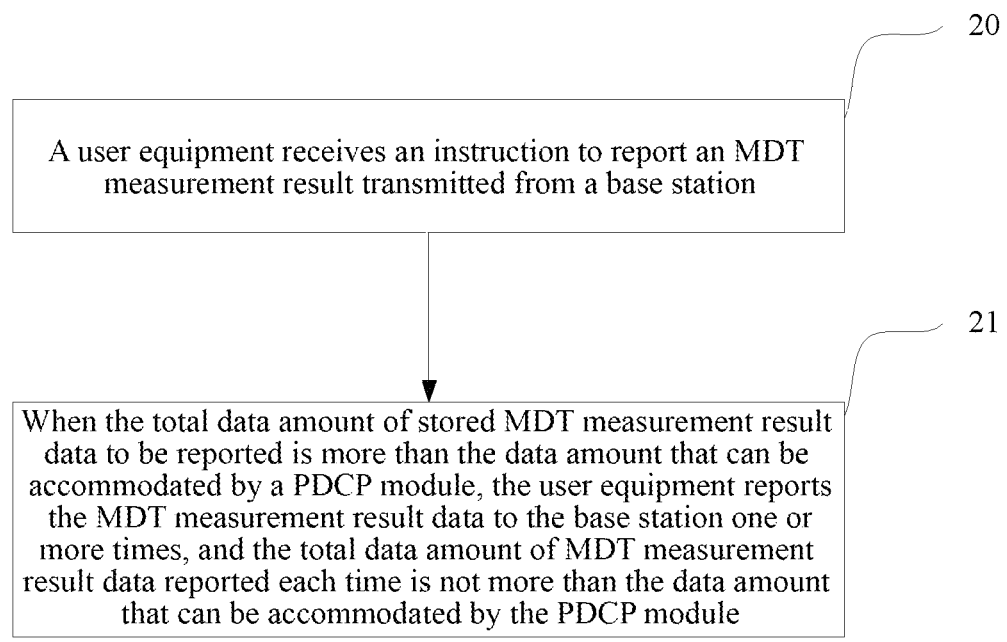
FIG. 2 is a schematic flow chart of a method according to an embodiment of the invention.

Referring to FIG. 2, a method for reporting an MDT measurement result according to an embodiment of the invention particularly includes the following steps:

Step 20: A user equipment receives an instruction to report an MDT measurement result transmitted from a base station; and Step 21: When the total data amount of stored MDT measurement result data to be reported is more than the data amount that can be accommodated by a PDCP module, the user equipment reports the MDT measurement result data to the base station one or more times, and the total data amount of MDT measurement result data reported each time is not more than the data amount that can be accommodated by the PDCP module.

In the step 21, the user equipment can report the MDT measurement result data to the base station one or more times particularly in the following two schemes:

A first scheme is particularly as follows:

A. The user equipment transmits, to the base station, data packet carrying the unreported MDT measurement result data, the total data amount of which is not more than the data amount that can be accommodated by the PDCP module; and B. The user equipment determines whether an instruction transmitted from the base station to report an MDT measurement result is received again, and if so, returns to the step A.

A second scheme is particularly as follows:

C. The user equipment transmits, to the base station, data packet carrying the unreported MDT measurement result data, the total data amount of which is not more than the data amount that can be accommodated by the PDCP module; and D. The user equipment determines whether there is further unreported MDT measurement result data and if so, returns to the step C.

In this scheme, the user equipment can carry a serial number, which indicates a transmission order of the data packet, in the data packet carrying the unreported MDT measurement result data before the user equipment transmits the data packet to the base station.

In the foregoing two schemes, the base station can determine whether the user equipment has further unreported MDT measurement result data or whether the report has been finished in the following three methods:

In the first method, the user equipment transmits a log available indicator message to the base station before the user equipment receives the instruction transmitted from the base station to report an MDT measurement result, wherein the log available indicator message carries information on the number of data packets, to be reported, carrying the MDT measurement result data.

In the second method, the user equipment carries report progress information in the data packet carrying the unreported MDT measurement result data before the user equipment transmits the data packet, wherein the report progress information indicates whether the user equipment has further unreported MDT measurement result data.

In the third method, the user equipment transmits a log available indicator message to the base station before the user equipment receives the instruction transmitted from the base station to report an MDT measurement result, wherein the log available indicator message carries information on the number of data packets, to be reported, carrying the MDT measurement result data; and The user equipment carries report progress information in the data packet carrying the unreported MDT measurement result data before the user equipment transmits the data packet.

In the foregoing two schemes, the data amount of MDT measurement result data reported by the user equipment each time can be limited to being not more than the data amount that can be accommodated by the PDCP module by the format of a data packet in the RRC protocol particularly as follows:

Firstly the user equipment fills the data packet with the unreported MDT measurement result data in a preset format of MDT report signaling, and the total data amount carried in the data packet filled in this preset format is not more than the data amount that can be accommodated by the PDCP module; and then the user equipment transmits the data packet filled with the MDT measurement result data to the base station.

Alternatively an RRC module of the user equipment can perform its own statistic calculation and control on its own initiative the total data amount of MDT measurement result data reported each time not to be more than the data amount that can be accommodated by the PDCP module particularly as follows:

Firstly the user equipment fills the data packet with the unreported MDT measurement result data and calculates the data amount of filled MDT measurement result data; and when the data amount is less than the data amount that can be accommodated by the PDCP module, the user equipment further fills the data packet with the MDT measurement result data and the total data amount of filled data is not more than the data amount that can be accommodated by the PDCP module; and then the user equipment transmits the data packet filled with the MDT measurement result data to the base station.

Figure 3:
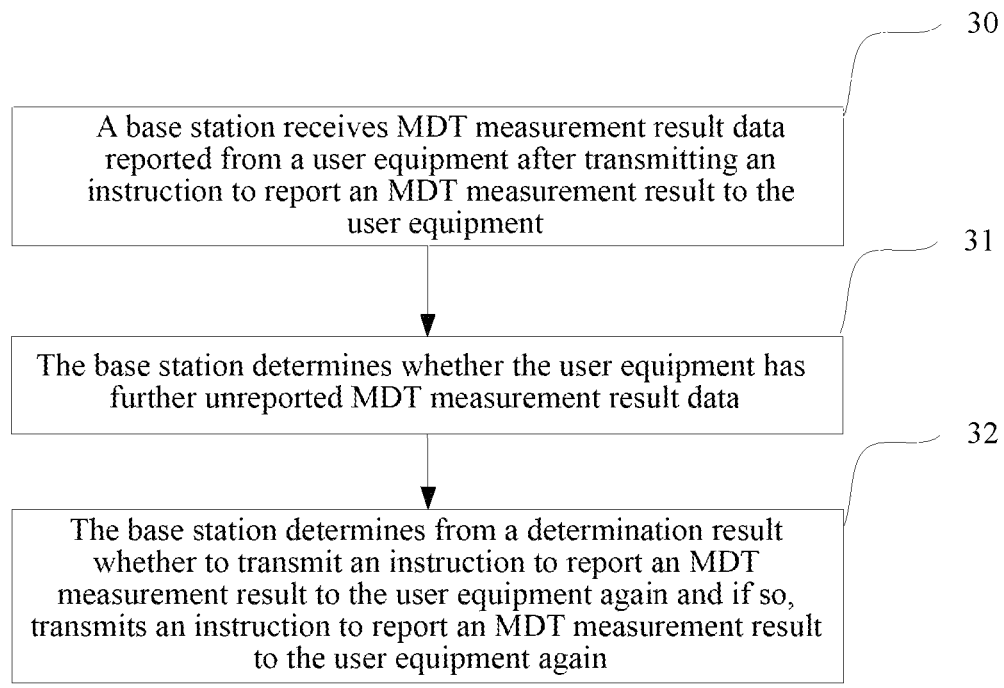
FIG. 3 is a schematic flow chart of another method according to an embodiment of the invention.

Referring to FIG. 3, an embodiment of the invention further provides a method for instructing an MDT measurement result to be reported particularly includes the following steps:

Step 30: A base station receives MDT measurement result data reported from a user equipment after transmitting an instruction to the user equipment to report an MDT measurement result;

Step 31: The base station determines whether the user equipment has further unreported MDT measurement result data; and Step 32: The base station determines from a determination result whether to transmit an instruction again to the user equipment to report an MDT measurement result and if so, transmits an instruction again to the user equipment to report an MDT measurement result.

In the step 31, the base station can determine whether the user equipment has further unreported MDT measurement result data according to report progress information in a data packet carrying the MDT measurement result data; or The base station can determine whether the user equipment has further unreported MDT measurement result data according to information, carried in an available indicator message transmitted from the user equipment, on the number of MDT measurement result data packets to be reported; or The base station can determine whether the user equipment has further unreported MDT measurement result data according to report progress information in a data packet carrying the MDT measurement result data and information, carried in an available indicator message transmitted from the user equipment, on the number of MDT measurement result data packets to be reported.

In the step 32, the base station can transmit an instruction to report an MDT measurement again to the user equipment upon determining that the user equipment has further unreported MDT measurement result data.

In the step 32, the base station can further sequence and then store the received respective MDT measurement result data according to an order in which the MDT measurement result data is received or a serial number in a data packet carrying the MDT measurement result data.

Figure 4:
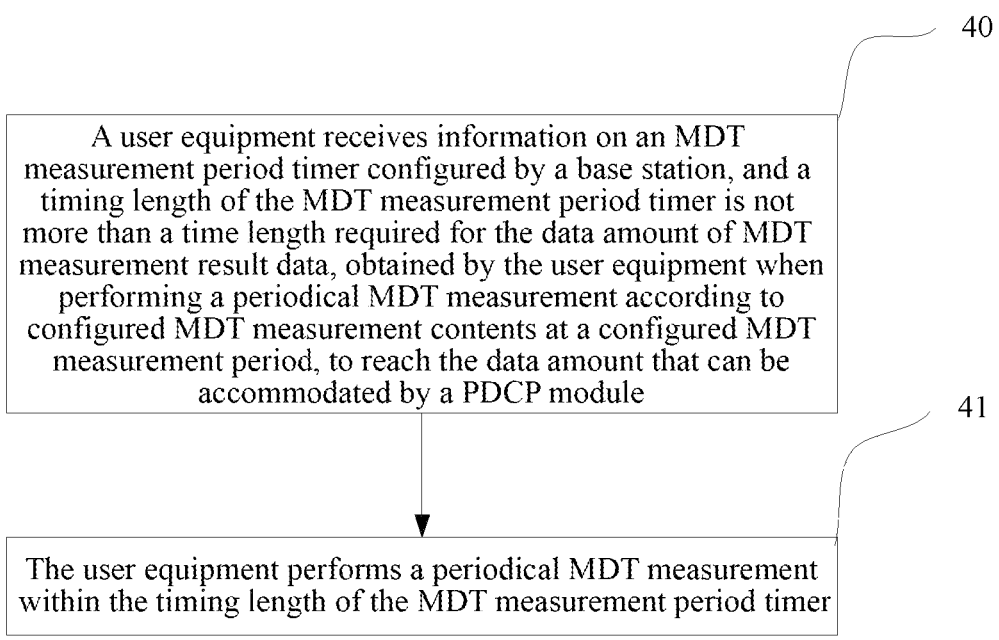
FIG. 4 is a schematic flow chart of a further method according to an embodiment of the invention.

Referring to FIG. 4, an embodiment of the invention further provides a method of a periodical MDT measurement particularly includes the following steps:

Step 40: A user equipment receives information on an MDT measurement period timer configured by a base station, and a timing length of the MDT measurement period timer is not longer than a preset time length which is a time length required for the data amount of MDT measurement result data, obtained by the user equipment when performing a periodical MDT measurement according to configured MDT measurement contents at a configured MDT measurement periodicity, to reach the data amount that can be accommodated by a PDCP module; and the MDT measurement contents here include a downlink preamble measurement, etc.

Step 41: The user equipment performs a periodical MDT measurement within the timing length of the MDT measurement period timer.

The user equipment reports the stored measured MDT measurement result data to the base station after the step 41. Specifically:

The user equipment transmits a log available indicator message to the base station in a connection setup or connection reestablishment or cell update or handover completion procedure; and the user equipment receives an instruction to report an MDT measurement result transmitted from the base station and reports the stored MDT measurement result data to the base station.

Figure 5:
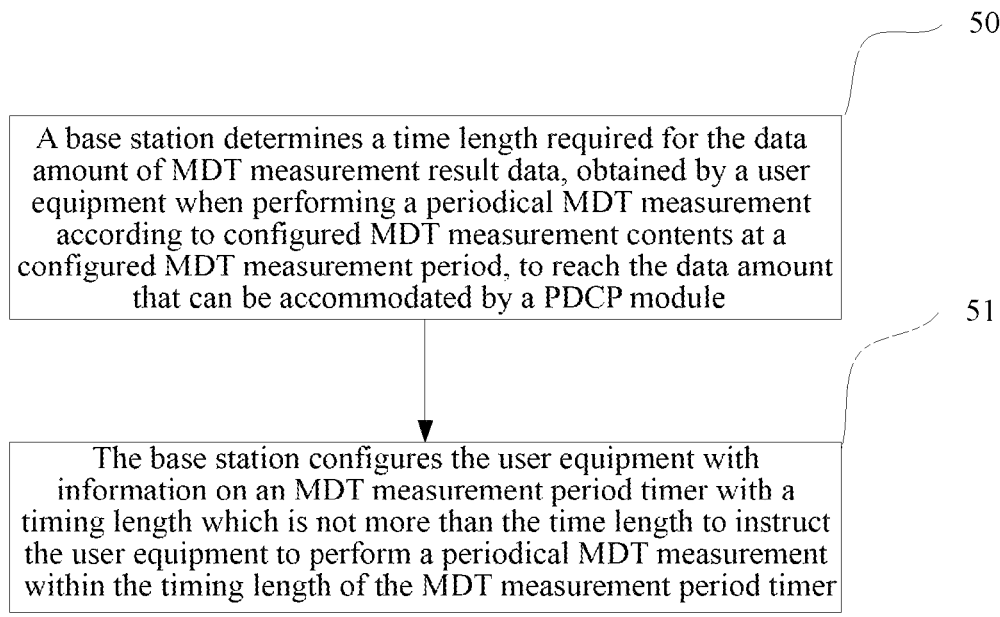
FIG. 5 is a schematic flow chart of still another method according to an embodiment of the invention.

Referring to FIG. 5, an embodiment of the invention further provides a method for configuring an MDT measurement period timer particularly the following steps:

Step 50: A base station determines a time length required for the data amount of MDT measurement result data, obtained by a user equipment when performing a periodical MDT measurement according to configured MDT measurement contents at a configured MDT measurement periodicity, to reach the data amount that can be accommodated by a PDCP module;

Specifically the base station can determine the time length T in the following method:

$$T = t*N = t*(Q/q),$$

where t is the MDT measurement period, Q is the data amount that can be accommodated by the PDCP module, q is the data amount obtained by performing one measurement on the MDT measurement contents, and N is the number of measurements to be performed for the data amount of obtained MDT measurement result data to reach Q. The MDT measurement contents here include a downlink preamble measurement, etc.

Step 51: The base station configures the user equipment with information on an MDT measurement period timer with a timing length of which is not longer the time length to instruct the user equipment to perform a periodical MDT measurement within the timing length of the MDT measurement period timer.

The invention will be described below in connection with particular embodiments.

Figure 6A:
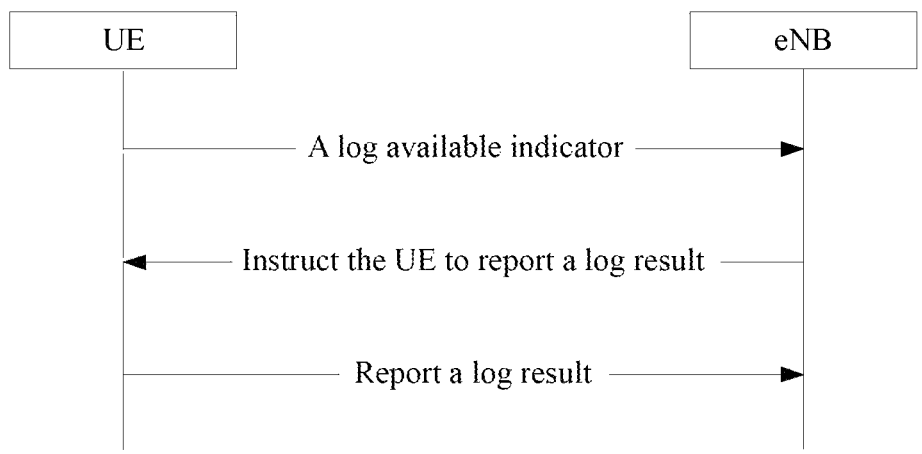
FIG. 6A is a schematic flow chart of reporting an MDT according to an embodiment of the invention.

Reporting of a logged MDT is controlled at the network side, and a UE will transmit a log available indicator notification to the network side before the UE is instructed by the network to make a report. The indicator is typically transmitted in a setup procedure/handover process/reestablishment procedure/cell update procedure in a typical flow as illustrated in FIG. 6A:

The UE enters a connected mode from an idle mode or has a cell changed (handover/reestablishment/cell update) in a connected mode and will notify the network side by indicating in uplink RRC signaling whether there is a log available. Upon reception of the log available indicator, the network side will request the UE to report a specific measurement result of the available log.

An MDT log data can not be reported by the UE on its own initiative to the network side, but instead the UE shall report the log available indicator to tell the presence of the log, and it is decided at the network side whether to obtain the log data. If the UE is instructed by the network side to report the log result, then the UE encapsulates the stored the log results into a data packet in a specific format and transmits them to the network side.

In an inventive solution, the size of a report for a configured MDT measurement exceeds a range accommodated by a PDCP module, then the report is segmented and transmit several times at the RRC layer; the UE indicates in each report message whether there remains a log result unreported due to the size; and it is decided at the network side after interpreting each report message whether to instruct the UE to further report a log result; the UE can tell in advance how many log result reports in total will be transmitted this time while reporting log availability; and if only a periodical log measurement is configured, then the amount of log data of the UE can be controlled by a timer which limiting a measurement period so as to thereby ensure that a limited range of the PDCP module will not be exceeded.

First Embodiment

Figure 6B:
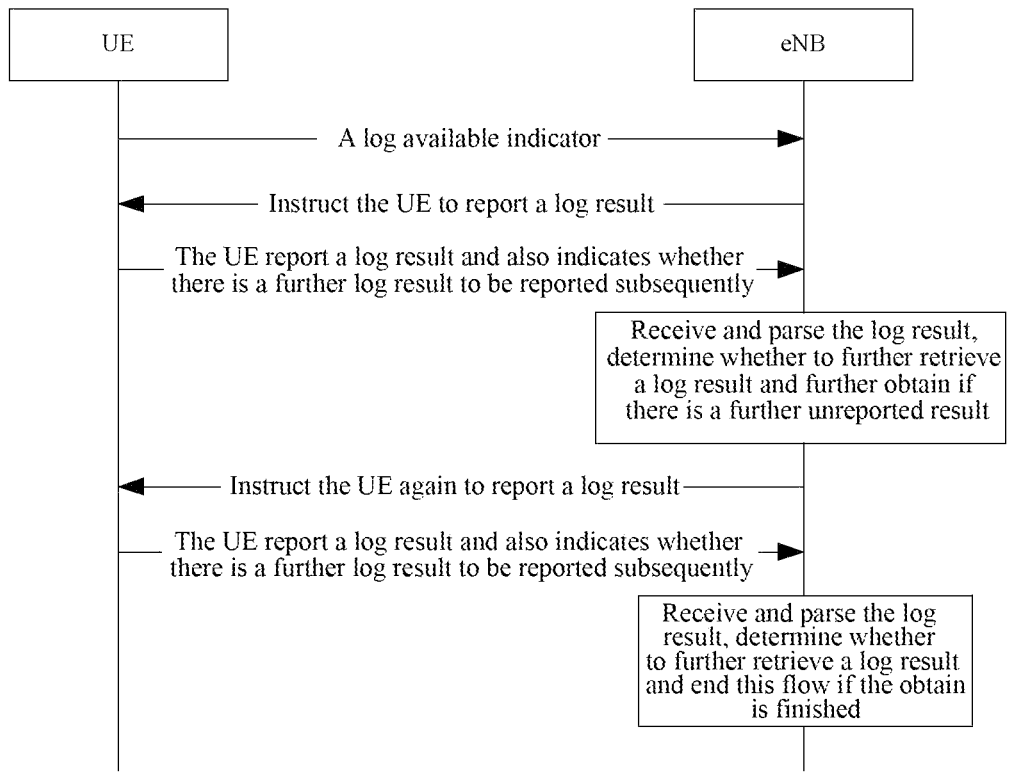
FIG. 6B is a schematic flow chart of reporting an MDT according to a first embodiment of the invention.

In FIG. 6B, the UE indicates, in a report message of an MDT measurement result, whether there is a further log result to be subsequently transmitted.

Figure 6C:
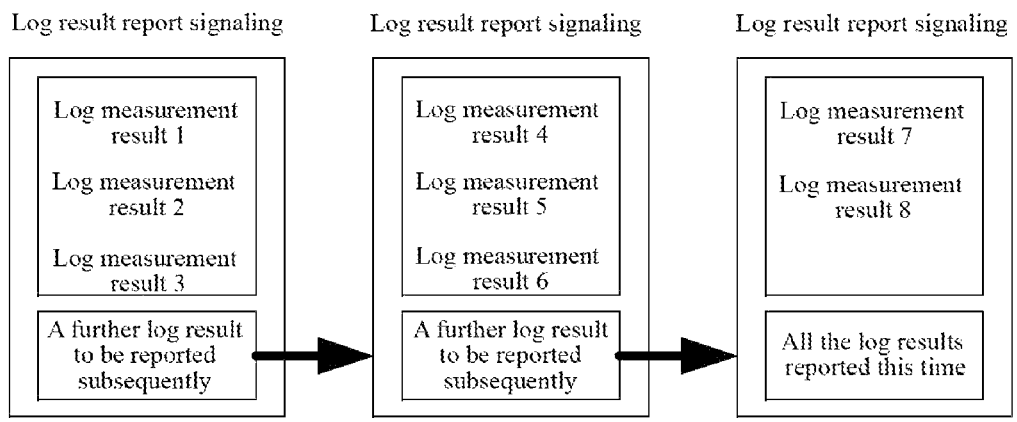
FIG. 6C is a schematic diagram of reporting an MDT according to the first embodiment of the invention.
Figure 6D:
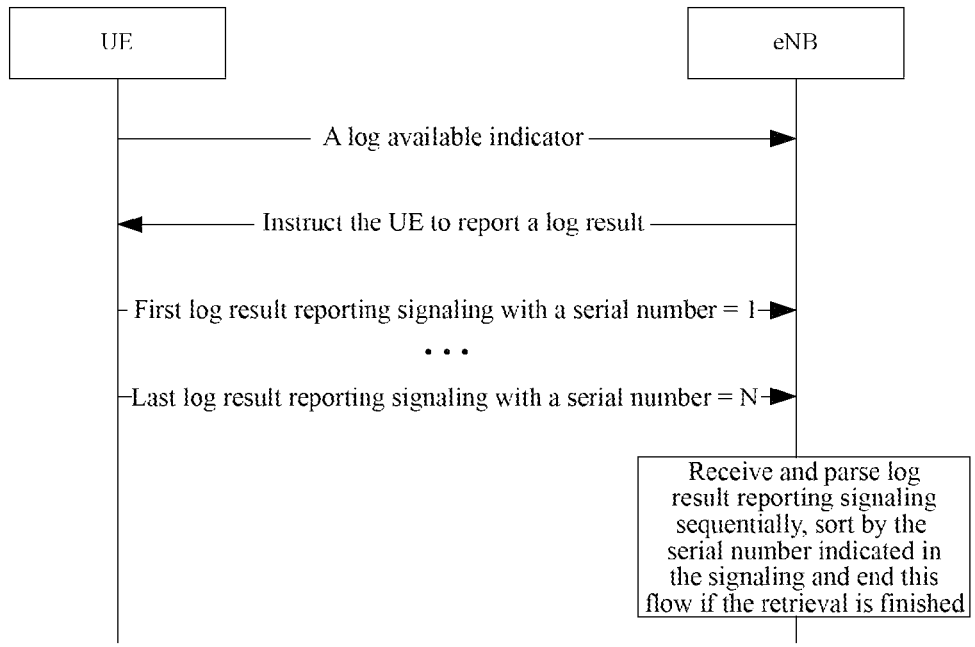
FIG. 6D is a schematic flow chart of reporting an MDT according to a second embodiment of the invention.

In FIG. 6C, each piece of log result report signaling typically carries contents of a log result, and 1-bit indicator information can be carried in the signaling while the log result is reported, wherein the 1-bit indicator information is used to notify the network side of whether there is a further log result to be subsequently reported, that is, whether a data packet reported this time is the last data packet of the log report. Since logs are obtained sequentially by the UE while performing a measurement constantly, the UE can store the logs in their measurement order and will not fill, in a data packet, data of a log measurement result to be transmitted to the network side any more but indicate "Further log result data remains unfilled and waits for being reported" at a corresponding location in the format of the data packet upon detecting of the data amount of filled data exceeding a limit. The UE transmits the data packet, and contents of the data packet is parsed at the network side upon reception thereof to obtain the indicator and to decide whether to further obtain a remaining log result from the UE.

Second Embodiment

The UE receives a obtain command of the network side and fills all stored log results sequentially into a plurality of data packets for transmission.

After signaling is transmitted at the network side to the UE to instruct the UE to report a log result, the UE can transmit log results several times if the UE can not transmit all the log results in a single data packet due to a limited capacity range of a PDCP module or the like. A instruction signaling transmitted at the network side to the UE can allow the UE to transmit one or more report signaling of log results to the network side, and the log results can be filled respectively into a plurality of data packets and transmitted to the network side separately in a plurality of RRC signaling as illustrated in FIG. 6.

Since the UE typically stores obtained logs in their measurement order, it is desirable to report them in order. A "serial number" can be introduced to each report signaling so that the a plurality of RRC signaling of log results of the UE can be parsed respectively at the network side upon reception thereof to sequence all the log results in an order that the UE transmits them.

Third Embodiment

The UE can notify in advance the network side of the number of data packets to be subsequently reported while reporting log availability so that a sufficient resource can be reserved at the network side.

A log available indicator may be reported in a connection setup/connection reestablishment/cell update/handover completion procedure, and if there is an unreported log result or only a few data packets among a plurality of data packets have been reported at this time, then the UE can indicate to the network side, how many log result data packets wait for being reported, together with log available indicator.

For example, an integer-type format of RestPacakges can be added at the same level of a log available indicator:

| {An omitted part} | | |
|---|---|---|
| logAvailable | ENUMERATED {true} | OPTIONAL, |
| restPackages | INTEGER (1 ... 8) | OPTIONAL, |
| {An omitted part} | | |

A 3-bit format of restPacakges is added following a log available indicator and can indicate the presence of 8 log report messages at most. If logAvailable is present, then restPacakges shall indicate one of the values 1 to 8; and if no logAvailable indicator is present, then correspondingly no restPacakges is present indicating that no data packet waits for being reported. A protocol can be defined by specifying another value in place of "8" in the foregoing example dependent upon a varying report policy.

Or:

| {An omitted part} | | |
|---|---|---|
| logAvailable | ENUMERATED {true} | OPTIONAL, |
| restPackages | INTEGER (0 ... 7), | |
| {An omitted part} | | |

A 3-bit format of restPacakges is added following a log available indicator and can indicate at most 8 cases. If logAvailable is present, then restPacakges shall indicate one of the values 1 to 7; and if no logAvailable indicator is present, then correspondingly this restPacakge shall be equal to zero indicating that no data packet waits for being reported. A protocol can be defined by specifying another value in place of "7" in the foregoing example dependent upon a varying report policy. This indicator solution saves one bit as compared with the foregoing solution although the number of data packets that can be indicated is increased by one as well.

The solutions in the first and third embodiments and the second and third embodiments can be used in combination.

For example, the UE can notify in advance the network side of the total number of log result data packets to be reported while indicating log available and further transmit them several times as in the first embodiment or the second embodiment so that whether there is a data packet to be transmitted or whether transmission has been finished can be known to the network side.

Fourth Embodiment

In the case of a regular periodical log, the size of a report can be predicated by the network side, so the amount of log data of the UE can be controlled by a timer to limit a measurement period to thereby ensure that a limited range of a PDCP module will not be exceeded.

Since a periodical log is introduced in the R10 phase only for a log MDT in an idle mode, both contents and a periodicity of the log are configured at the network side. A period of time required for a UE to reach a limited capacity of the PDCP module given a specific period interval of the log and specific contents of the log can be calculated and derived at the network side. The amount of data of a log result can be controlled in size at the network side by configuring the UE with an MDT measurement period timer.

A log result or a log measurement result in the drawings refers to an MDT measurement result stored by the user equipment.

Figure 7:
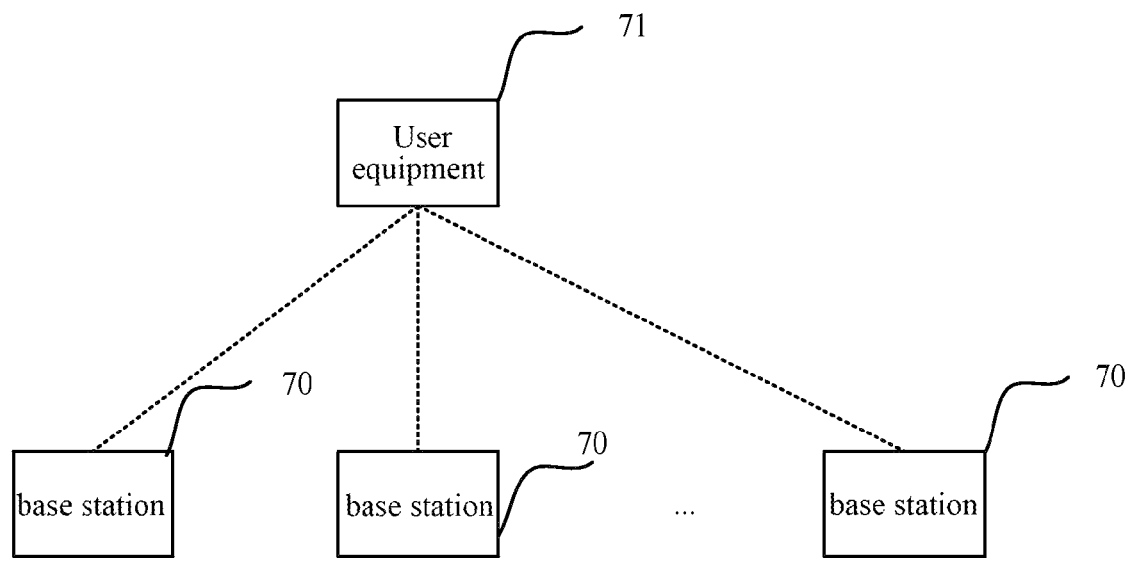
FIG. 7 is a schematic structural diagram of a system according to an embodiment of the invention.

Referring to FIG. 7, an embodiment of the invention further provides a wireless communication system including:

A user equipment 70, configured to receive an instruction to report an MDT measurement result transmitted from a base station; and when the total data amount of stored MDT measurement result data to be reported is more than the data amount that can be accommodated by a PDCP module, to report the MDT measurement result data to the base station one or more times, where the total data amount of MDT measurement result data reported each time is not more than the data amount that can be accommodated by the PDCP module; and The base station 71, configured to receive the MDT measurement result data reported from the user equipment, to determine whether the user equipment has further unreported MDT measurement result data, to determine from a determination result whether to transmit an instruction to report an MDT measurement result to the user equipment again and if so, to transmit an instruction to report an MDT measurement result to the user equipment again.

Figure 8:
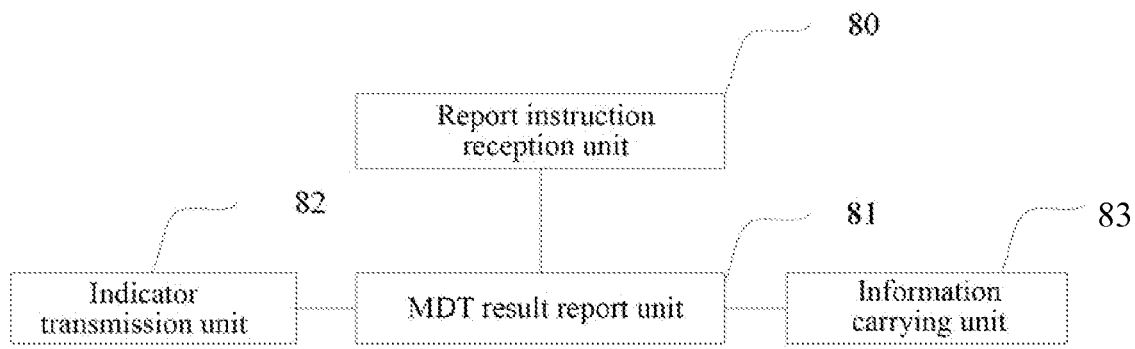
FIG. 8 is a schematic structural diagram of an apparatus according to an embodiment of the invention.

Referring to FIG. 8, an embodiment of the invention further provides a user equipment including:

A report instruction reception unit 80, configured to receive an instruction to report an MDT measurement result transmitted from a base station; and An MDT result report unit 81, configured, when the total data amount of MDT measurement result data, to be reported, stored at the present user equipment is more than the data amount that can be accommodated by a PDCP module, to report the MDT measurement result data to the base station one or more times, where the total data amount of MDT measurement result data reported each time is not more than the data amount that can be accommodated by the PDCP module.

The MDT result report unit 81 includes:

A first data packet transmission unit, configured to transmit, to the base station, a data packet carrying the unreported MDT measurement result data, the total data amount of which is not more than the data amount that can be accommodated by the PDCP module; and A first determination unit, configured to determine whether an instruction to report an MDT measurement result transmitted from the base station is received again and if so, to trigger the first data packet transmission unit to transmit the data packet to the base station again.

The MDT result report unit 81 includes:

A second data packet transmission unit, configured to transmit, to the base station, a data packet carrying the unreported MDT measurement result data, the total data amount of which is not more than the data amount that can be accommodated by the PDCP module; and A second determination unit, configured to determine whether there is further unreported MDT measurement result data and if so, to trigger the second data packet transmission unit to transmit the data packet to the base station again.

The second data packet transmission unit is further configured:

To carry a serial number in the data packet, where the serial number indicates a transmission order of the data packet.

The user equipment further includes:

An indicator transmission unit 82, configured to transmit a log available indicator message to the base station before the instruction to report an MDT measurement result transmitted from the base station is received, wherein the log available indicator message carries information on the number of data packets, to be reported, carrying the MDT measurement result data.

The user equipment further includes:

An information carrying unit 83, configured to carry report progress information in the data packet carrying the unreported MDT measurement result data before the data packet is transmitted to the base station, wherein the report progress information indicates the user equipment has further unreported MDT measurement result data.

The first data packet transmission unit or the second data packet transmission unit is particularly configured:

To fill the data packet with the unreported MDT measurement result data in a preset format of MDT report signaling, where the total amount of data carried in the data packet filled in this preset format is not more than the data amount that can be accommodated by the PDCP module; and to transmit the data packet to the base station; or To fill the data packet with the unreported MDT measurement result data and to calculate the data amount of filled MDT measurement result data; and when the data amount is less than the data amount that can be accommodated by the PDCP module, to further fill the data packet with the MDT measurement result data, where the total amount of filled data is not more than the data amount that can be accommodated by the PDCP module; and to transmit the data packet to the base station.

Figure 9:
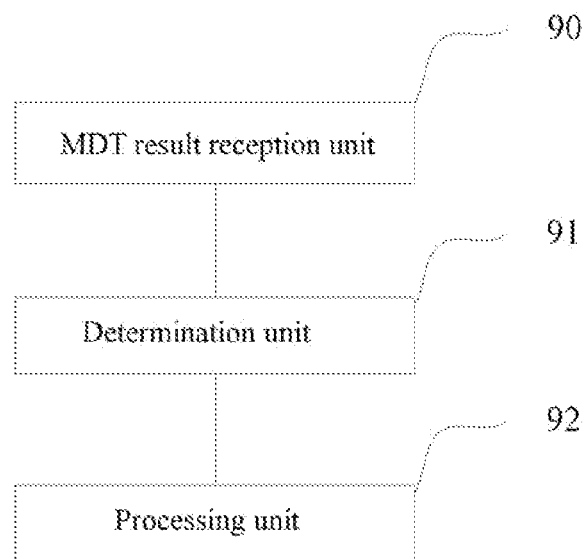
FIG. 9 is a schematic structural diagram of an apparatus according to an embodiment of the invention.

Referring to FIG. 9, an embodiment of the invention provides a base station including:

An MDT result reception unit 90, configured to receive MDT measurement result data reported from a user equipment after transmitting an instruction to report an MDT measurement result to the user equipment;

A determination unit 91, configured to determine whether the user equipment has further unreported MDT measurement result data; and A processing unit 92, configured to determine from a determination result of the determination unit whether to transmit an instruction to report an MDT measurement result to the user equipment again and to transmit an instruction to report an MDT measurement result upon positive determination to the user equipment again.

The determination unit 91 is configured:

To determine whether the user equipment has further unreported MDT measurement result data according to report progress information in data packets carrying the MDT measurement result data and/or information, carried in an available indicator message transmitted from the user equipment, on the number of MDT measurement result data packets to be reported.

The processing unit 92 is configured:

To determine an instruction to report an MDT measurement result to be transmitted to the user equipment again upon determining that the user equipment has further unreported MDT measurement result data.

The processing unit 92 is further configured:

To sequence and then store the received respective MDT measurement result data according to an order in which the MDT measurement result data is received or a serial number in a data packet carrying the MDT measurement result data.

Referring back to FIG. 7, an embodiment of the invention further provides a wireless communication system including:

A base station 71 configured to determine a time length required for the data amount of MDT measurement result data, obtained by a user equipment when performing a periodical MDT measurement according to configured MDT measurement contents at a configured MDT measurement periodicity, to reach the data amount that can be accommodated by a Packet Data Convergence Protocol (PDCP) module and to configure the user equipment with information on an MDT measurement period timer with a timing length of which is not more than the time length; and The user equipment 70, configured to receive the information on the MDT measurement period timer and to perform a periodical MDT measurement within the timing length of the MDT measurement period timer.

Figure 10:
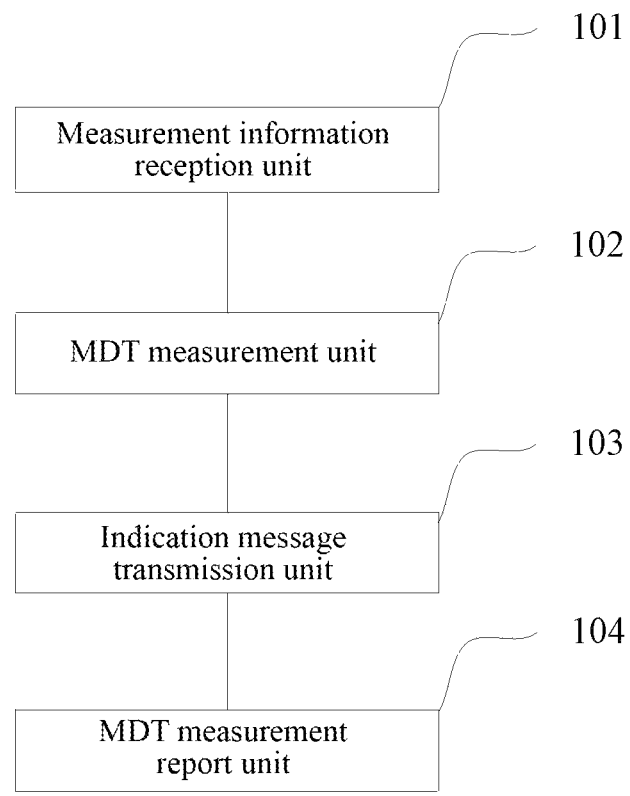
FIG. 10 is a schematic structural diagram of an apparatus according to an embodiment of the invention.

Referring to FIG. 10, an embodiment of the invention further provides a user equipment including:

A measurement information reception unit 101, configured to receive information on an MDT measurement period timer configured by a base station, where a timing length of the MDT measurement period timer is not more than a preset time length which is a time length required for the data amount of MDT measurement result data, obtained by the user equipment when performing a periodical MDT measurement according to configured MDT measurement contents at a configured MDT measurement periodicity, to reach the data amount that can be accommodated by a PDCP module; and An MDT measurement unit 102, configured to perform a periodical MDT measurement within the timing length of the MDT measurement period timer.

The user equipment further includes:

An indication message transmission unit 103, configured to transmit a log available indicator message to the base station; and An MDT measurement report unit 104, configured to receive an instruction to report an MDT measurement result transmitted from the base station and to report the stored MDT measurement result data to the base station.

Figure 11:
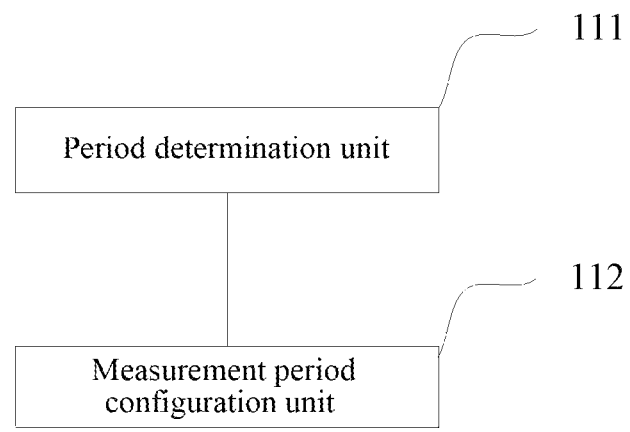
FIG. 11 is a schematic structural diagram of an apparatus according to an embodiment of the invention.

Referring to FIG. 11, an embodiment of the invention further provides a base station including:

A period determination unit 111 configured to determine a time length required for the data amount of MDT measurement result data, obtained by a user equipment when performing a periodical MDT measurement according to configured MDT measurement contents at a configured MDT measurement periodicity, to reach the data amount that can be accommodated by a PDCP module; and A measurement period configuration unit 112, configured to configure the user equipment with information on an MDT measurement period timer with a timing length not more than the time length to instruct the user equipment to perform a periodical MDT measurement for the timing length of the MDT measurement period timer.

In summary, advantageous effects of the invention include:

In the solutions according to the embodiments of the invention, a user equipment receives an instruction to report an MDT measurement result transmitted from a base station, and if the total data amount of stored MDT measurement result data to be reported is more than the data amount that can be accommodated by a PDCP module, then the user equipment reports the MDT measurement result data to the base station one or more times, and the total data amount of MDT measurement result data reported each time is not more than the data amount that can be accommodated by the PDCP module. As can be apparent, with the invention, the data amount of MDT measurement data reported by the UE will not exceed the data amount that can be accommodated by the PDCP to thereby address the problem of failing to report the MDT measurement result data due to the data amount of MDT measurement result data reported by the UE exceeding the data amount that can be accommodated by the PDCP module.

In the solutions according to the embodiments of the invention, a base station determines a time length required for the data amount of MDT measurement result data, obtained by a user equipment when performing a periodical MDT measurement according to configured MDT measurement contents at a configured MDT measurement periodicity, to reach the data amount that can be accommodated by a PDCP module, and configures the user equipment with information on an MDT measurement period timer with a timing length not more than the time length, and the user equipment performs a periodical MDT measurement within the timing length of the MDT measurement period timer. As can be apparent, the timing length of the MDT measurement period timer is not more than the time length required for the data amount of MDT measurement result data obtained by the user equipment to reach the data amount that can be accommodated by the PDCP module, so the amount of data obtained by the user equipment after performing a periodical MDT measurement within the timing length of the MDT measurement period timer will not exceed the data amount that can be accommodated by the PDCP module, and thus occurrence will be avoided of the problem of failing to report the MDT measurement result data due to the data amount of MDT measurement result data reported by the UE exceeding the data amount that can be accommodated by the PDCP module.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for reporting a Minimization of Drive Tests, MDT, measurement result, comprising the steps of:

receiving, by a user equipment, an instruction to report an MDT measurement result transmitted from a base station; and when the total data amount of stored MDT measurement result data, to be reported, is more than data amount that can be accommodated by a Packet Data Convergence Protocol, PDCP, module, reporting, by the user equipment, the MDT measurement result data to the base station one or more times, wherein the total data amount of MDT measurement result data reported each time is not more than the data amount that can be accommodated by the PDCP module;

wherein reporting, by the user equipment, the MDT measurement result data to the base station one or more times, wherein the total data amount of MDT measurement result data reported each time being not more than the data amount that can be accommodated by the PDCP module, comprises:

A. transmitting, by the user equipment, a data packet carrying the unreported MDT measurement result data to the base station, wherein the total data amount of the data packet is not more than the data amount that can be accommodated by the PDCP module; and B. returning to the step A if the user equipment receives an instruction to report an MDT measurement result transmitted from the base station again;

wherein, at least one of:

the user equipment transmits a log available indicator message to the base station before the user equipment receives the instruction to report an MDT measurement result transmitted from the base station, wherein the log available indicator message carries information on the number of data packets, to be reported, carrying the MDT measurement result data; or the user equipment carries report progress information in the data packet carrying the unreported MDT measurement result data before the user equipment transmits the data packet, wherein the report progress information indicates whether the user equipment has further unreported MDT measurement result data;

wherein before the user equipment transmits a data packet carrying the unreported MDT measurement result data to the base station, the method further comprises:

carrying a serial number in the data packet, wherein the serial number indicates a transmission order of the data packet.

2. The method according to claim 1, wherein transmitting, by the user equipment, a data packet carrying the unreported MDT measurement result data to the base station, wherein the total data amount of the data packet is not more than the data amount that can be accommodated by the PDCP module, filling, by the user equipment, the data packet with the unreported MDT measurement result data in a preset format of MDT report signaling, wherein the total data amount carried in the data packet filled in this preset format is not more than the data amount that can be accommodated by the PDCP module; and transmitting the data packet to the base station; or filling, by the user equipment, the data packet with the unreported MDT measurement result data and calculating the data amount of filled MDT measurement result data; and when the data amount is less than the data amount that can be accommodated by the PDCP module, further filling the data packet with the MDT measurement result data, wherein the total amount of filled data is not more than the data amount that can be accommodated by the PDCP module; and transmitting the data packet to the base station.

3. A method for instructing to report a Minimization of Drive Tests, MDT, measurement result, comprising the steps of:
   receiving, by a base station, MDT measurement result data reported from a user equipment after transmitting an instruction to report an MDT measurement result to the user equipment;
   determining, by the base station, whether the user equipment has further unreported MDT measurement result data;
   determining, by the base station, from a determination result whether to transmit an instruction to report an MDT measurement result to the user equipment again and if so, transmitting an instruction to report an MDT measurement result to the user equipment again and
   sequencing and then storing, by the base station, the received respective MDT measurement result data according to an order in which the MDT measurement result data is received or a serial number in a data packet carrying the MDT measurement result data;
   wherein the base station determines whether the user equipment has further unreported MDT measurement result data according to report progress information in a data packet carrying the MDT measurement result data and/or information, carried in an available indicator message transmitted from the user equipment, on the number of MDT measurement result data packets to be reported; wherein the report progress information indicates whether the user equipment has further unreported MDT measurement result data.

4. The method according to claim 3, wherein determining, by the base station, from a determination result whether to transmit an instruction to report an MDT measurement result to the user equipment again comprises:
   determining, by the base station, an instruction to report an MDT measurement result to the user equipment again upon determining that the user equipment has further unreported MDT measurement result data.

5. A user equipment, comprising:
   a report instruction reception unit configured to receive an instruction to report a Minimization of Drive Tests, MDT, measurement result transmitted from a base station; and
   an MDT result report unit configured, when the total data amount of MDT measurement result data, to be reported, stored at the present user equipment is more than the data amount that can be accommodated by a Packet Data Convergence Protocol, PDCP, module, to report the MDT measurement result data to the base station one or more times, wherein the total data amount of MDT measurement result data reported each time is not more than the data amount that can be accommodated by the PDCP module;
   wherein the MDT result report unit comprises:
   a first data packet transmission unit configured to transmit, to the base station, a data packet carrying the unreported MDT measurement result data, the total data amount of which is not more than the data amount that can be accommodated by the PDCP module; and
   a first determination unit, configured to determine whether an instruction to report an MDT measurement result transmitted from the base station is received again and if so, to trigger the first data packet transmission unit again to transmit a data packet carrying the unreported MDT measurement result data to the base station;
   wherein the first data packet transmission unit is further configured to carry a serial number in the data packet, wherein the serial number indicates a transmission order of the data packet;
   wherein the user equipment further comprises, at least one of:
      an indicator transmission unit configured to transmit a log available indicator message to the base station before the instruction transmitted from the base station to report an MDT measurement result is received, wherein the log available indicator carries information on the number of data packets, to be reported, carrying the MDT measurement result data; or
      an information carrying unit configured to carry, in the data packet carrying the unreported MDT measurement result data, report progress information before the data packet is transmitted to the base station, wherein the report progress information indicates whether the user equipment has further unreported MDT measurement result data.

\* \* \* \* \*